United States Patent [19]
Nier

[11] Patent Number: 5,803,848
[45] Date of Patent: Sep. 8, 1998

[54] GEAR CHANGE SYSTEM

[75] Inventor: Rolf Nier, Bad Urach, Germany

[73] Assignee: Gustav Magenwirth GmbH & Co., Germany

[21] Appl. No.: 810,774

[22] Filed: Mar. 5, 1997

[30] Foreign Application Priority Data

Mar. 6, 1996 [DE] Germany ......................... 196 08 717.1

[51] Int. Cl.$^6$ ........................... F16H 59/00; F16H 61/00; F16H 63/00
[52] U.S. Cl. .............................................................. 474/81
[58] Field of Search ................................. 474/78, 80, 81, 474/148, 150

[56] References Cited

U.S. PATENT DOCUMENTS

| | | | |
|---|---|---|---|
| 4,194,408 | 3/1980 | Hedrich | 474/81 |
| 4,412,828 | 11/1983 | Darby | 474/81 |
| 4,530,678 | 7/1985 | Wechsler | 474/81 |
| 5,213,548 | 5/1993 | Colbert et al. | 474/81 X |
| 5,213,549 | 5/1993 | Blanchard | 474/81 |
| 5,470,277 | 11/1995 | Romano | 474/81 X |

FOREIGN PATENT DOCUMENTS

| | | |
|---|---|---|
| 0 566 024 | 10/1993 | European Pat. Off. . |
| 0 566 025 | 10/1993 | European Pat. Off. . |
| 0 647 558 | 4/1995 | European Pat. Off. . |

*Primary Examiner*—Roger J. Schoeppel
*Attorney, Agent, or Firm*—Barry R. Lipsitz; Ralph F. Hoppin

[57] ABSTRACT

In order to improve a gear change system for bicycle derailleur gears, comprising a first chain changer for shifting the chain to different chain wheels on the pedal-crank side, a second chain changer for shifting the chain to different pinions on the wheel side, and a gear change device with a first switching unit for the first chain changer and with a second switching unit for the second chain changer and with a manually operated switching element by means of which both switching units can simultaneously be actuated so that by means of the latter the chain can simply be shifted to chain wheel/pinion combinations selected for a gear sequence and from a switched gear a transition is possible only to the next closest gear in the gear sequence, in such a way that a great degree of ease and comfort in switching can be achieved with the least possible effort, it is proposed that the first chain changer is a mechanical chain changer mechanically controllable through the first switching unit, and that the second chain changer is a chain changer electrically controllable through the second switching unit.

29 Claims, 7 Drawing Sheets

GEAR CHANGE SYSTEM

BACKGROUND OF THE INVENTION

The invention relates to a gear change (gear shift) system for bicycle derailleur gears, comprising a first chain changer for shifting the chain to different chain wheels on the pedal-crank side, a second chain changer for shifting the chain to different pinions on the wheel side, and a gear change device with a first switching unit for the first chain changer and with a second switching unit for the second chain changer and with a manually operated switching element by means of which both switching units can simultaneously be actuated in such a way that by means of the latter the chain can simply be shifted to chain wheel/pinion combinations selected for a gear sequence, and from a switched gear a transition is possible only to a gear in the immediately adjacent gear sequence.

Such gear change systems are known for example from DE-A-195 19 112.9.

These gear change systems however all operate according to a mechanical principle.

Gear change systems operating according to an electrical principle for derailleur gears are of course known, and are disclosed for example in EP-A-O 566 025 or EP-A-O 647 558 or EP-A-O 566 024, though they all have the disadvantage that the gear changers have to be designed so that they execute the gear change procedure with the greatest possible effort to shift the chain.

The object of the invention is accordingly to improve a gear change system of the above generic type so that gear changing can be executed more comfortably with the least possible effort.

SUMMARY OF THE INVENTION

This object is achieved according to the invention in a gear change system of the type described at the beginning, in that the first chain changer is a mechanical chain changer that can be mechanically controlled by the first switching unit and that the second chain changer is a chain changer that can be electrically controlled by the second switching unit. The solution according to the invention has the great advantage that on the one hand it exploits the improved level of gear changing comfort and in fact with the chain changer, which should be able to shift the chain between a plurality of pinions, and on the other hand has the advantage that the first chain changer is actuated mechanically, as before, since with this the chain can as a rule be shifted between a few chain wheels, whereas a higher degree of effort is required to shift the chain wheels.

Thus, the gear change device according to the invention is on the one hand particularly simply designed and constructed, while on the other hand it enables the advantages of ease and comfort of the electrical control device to be employed in the chain changer, with which a plurality of gear change procedures can be carried out.

It is particularly advantageous if the second switching unit comprises a switching signal generator unit which, on actuation of the switching element, generates switching signals by means of which the electrically controllable second chain changer can then be controlled in a simple manner.

Controlled by the manually operated switching element, the switching units could execute any type of movement. However, it has proved particularly suitable if the switching element can be rotated about an axis and if the signal generator unit produces the switching signals following a rotational movement initiated by the switching element.

The signal generator unit should in principle be adapted to the electrically controllable second chain changer that is employed. In the conventional solutions it is preferably arranged that the signal generator unit generates pulse electrical "on" or "off" switching signals for the second chain changer, so that the second chain changer can be controlled in a simple manner by means of these pulsed switching signals and such a control arrangement moreover provides the possibility substantially to reduce the electrical power required for control purposes.

It is preferably provided that the "on" switching signals and "off" switching signals are emitted at separate signal connections. Such an arrangement is for example appropriate for controlling the known chain changers manufactured by the Mavic company or other chain changers operating according to a similar principle, which likewise have a connection for "on" switching signals and a connection for "off" switching signals and moreover have the great advantage that they have a small electrical energy requirement since they derive the force required to shift the chain from a rotational movement of a chain changer pinion driven by the chain.

The signal generator unit can in principle be designed and constructed in various ways. It would for example be conceivable to use a synchro-generator and produce the appropriate switching pulses by means of an integrated circuit as a function of the rotational position of the manually operated switching element. Such a solution is however problematic having regard to the rough environmental conditions in which the gear change device is meant to operate reliably. For this reason it is advantageously arranged for the switching signal generator unit to have a gear shifting gate that cooperates with an electrical switching signal generator unit to produce the desired switching signals. Such a solution has great advantages on account of its robustness, particularly with regard to reliability and simplicity of construction and given the rough environmental conditions in which bicycles are used.

The switching signal generator unit can then be particularly advantageously implemented if the switching signal generator unit has two switching signal generators each of which produces a switching signal when actuated by the gear shifting gate, and if the gear switching gate comprises two gate or link paths each of which acts on one of the signal generators. This arrangement can differentiate in a particularly simple way between the switching processes, in which for example when "changing up" gear changing has to continue in one direction from one pinion to the next successive pinion or changing down has to be performed, because the chain has been shifted from one chain wheel to the other.

Furthermore, in a bicycle gear change device it has to be borne in mind that the device must also always be capable, during constant changing up or subsequent changing down, of reliably shifting the chain on the one hand to the correct pinion and on the other hand to the correct chain wheel.

For this reason it is preferably arranged for the switching signal generator unit to have a switching direction recognition unit which emits the switching signals generated by the signal generator unit as "on" switching signals or as "off" switching signals depending on the switching direction.

The switching direction recognition unit is preferably designed so that, depending on the switching direction, it transmits the switching signals of one of the switching signal generators to an "on" signal connection, and the signals of the other switching signal generator to an "off" signal connection, or vice versa.

With regard to the design of the first switching unit, no further details were given in connection with the previous explanation and discussion of the solution according to the invention. Thus, an advantageous embodiment provides that the first switching unit has a curved path element and a path follower cooperating with the latter, which for example mechanically actuates the first chain changer through a cable pull.

The curved path element is conveniently likewise rotatable about an axis of rotation and is thereby aligned at different angular settings relative to the path follower at different gear speeds.

It is preferable—especially in order to reduce the amount of manual force to be exerted on the switching element—to arrange that with the curved path element the angular distance between the switching positions between which the chain has to be shifted from one chain wheel to the other is greater than the angular distance between the switching positions in which the chain does not have to be shifted by the first chain changer from one chain wheel to the other.

As regards the manually actuated switching element, no further details were given in connection with the previously described solution. An advantageous solution thus provides for the switching element to be a conventional lever.

It is particularly advantageous however if the switching element is designed as a twist grip.

Such a twist grip is preferably arranged close to the handlebars of the bicycle and is designed for example as an integral part of the bicycle handlebars, so that it can be actuated manually without having to take the hands off the handlebars.

It is even more advantageous if the switching element forms rotatable bicycle handlebars so that gear changing can be effected directly by rotating the handle.

Further features and advantages of the invention are illustrated in the following description as well as in the drawings of some embodiments of the invention.

DETAILED DESCRIPTION OF THE INVENTION

Figure 1:
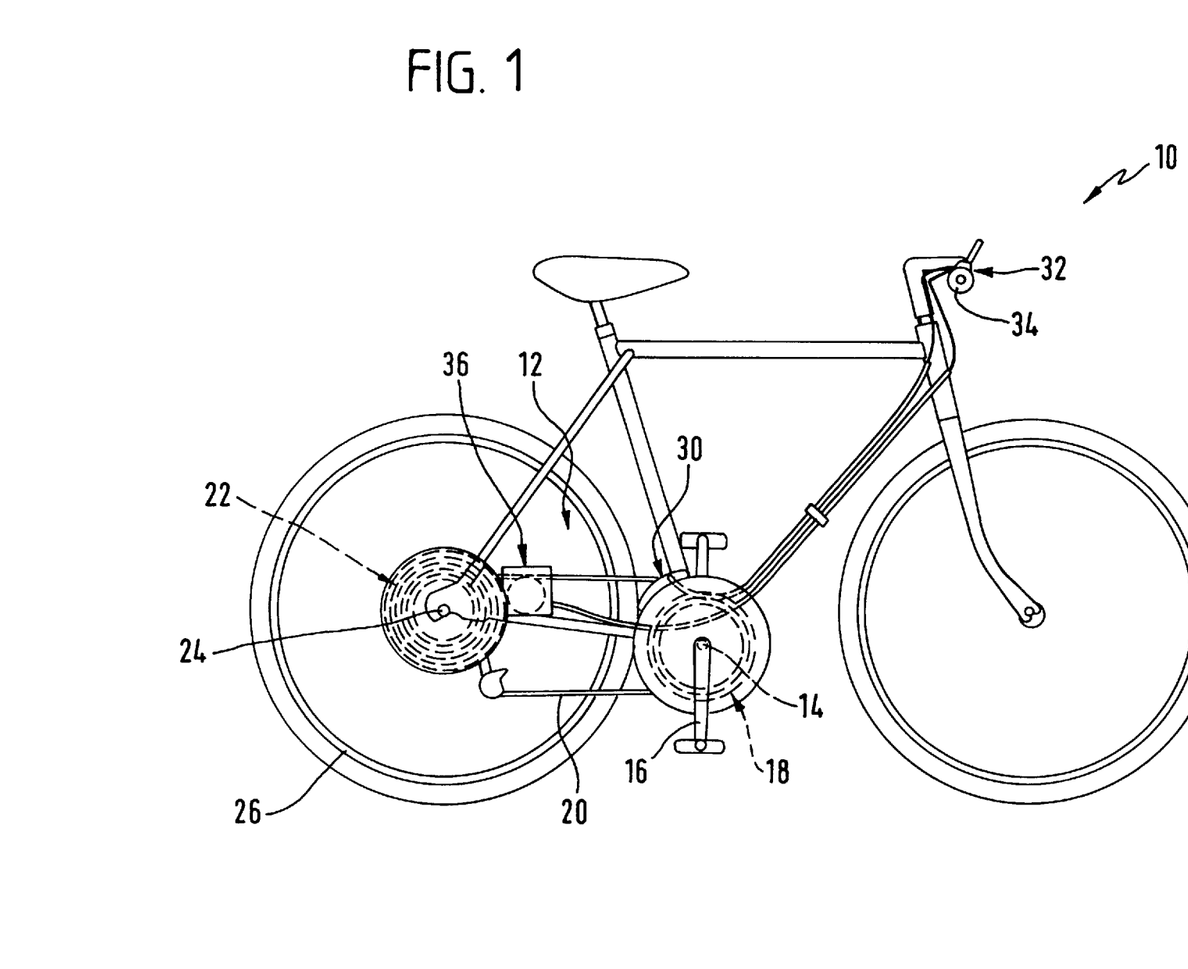
FIG. 1 is a diagrammatic view of a bicycle with a gear change system according to the invention.
Figure 2:
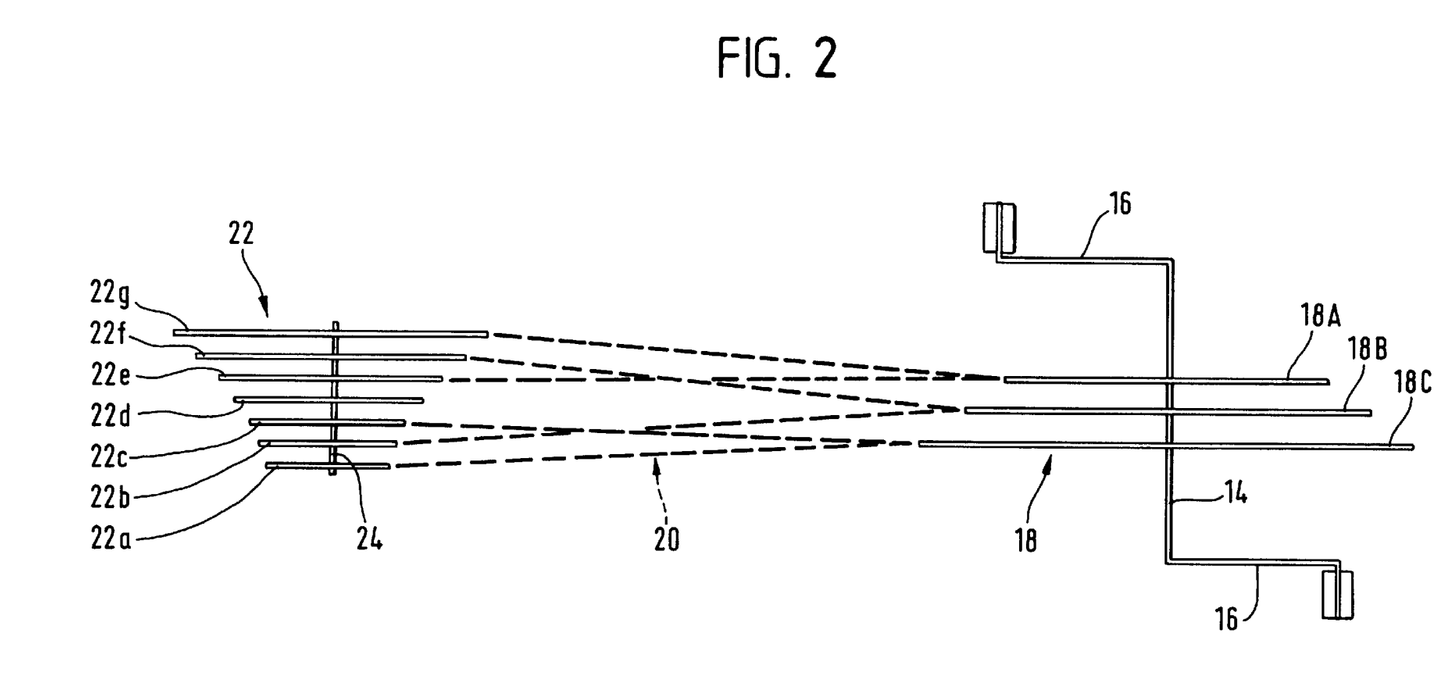
FIG. 2 is a diagrammatic plan view of the chain wheels and pinions as well as the possible positions of the chain.

A bicycle illustrated in FIG. 1 with a derailleur gear 12 according to the invention and generally denoted by 10 has, as illustrated in FIGS. 1 and 2, pedals 16 arranged on a pedal-crank bearing shaft 14, by means of which a set of chain wheels 18A, 18B and 18C rigidly arranged on the pedal-crank bearing shaft 14 can be driven.

A chain 20 engages one of the chain wheels 18A, 18B or 18C, with which chain a set of pinions 22a to 22g can be driven, the said pinions 22a to 22g being rigidly mounted on a hub 24 of a rear wheel 26.

In order to move the chain 20 from one of the chain wheels 18 to respectively another chain wheel 18, a first chain changer 30 is provided in the vicinity of the set of chain wheels, which chain changer can be actuated via a gear change device 32 arranged for example on the handlebars 34.

Furthermore, a second chain changer 36 can be actuated via the gear change device 32, this second changer serving to shift the chain 20 from one of the pinions 22 to another of the pinions 22.

Figure 3:
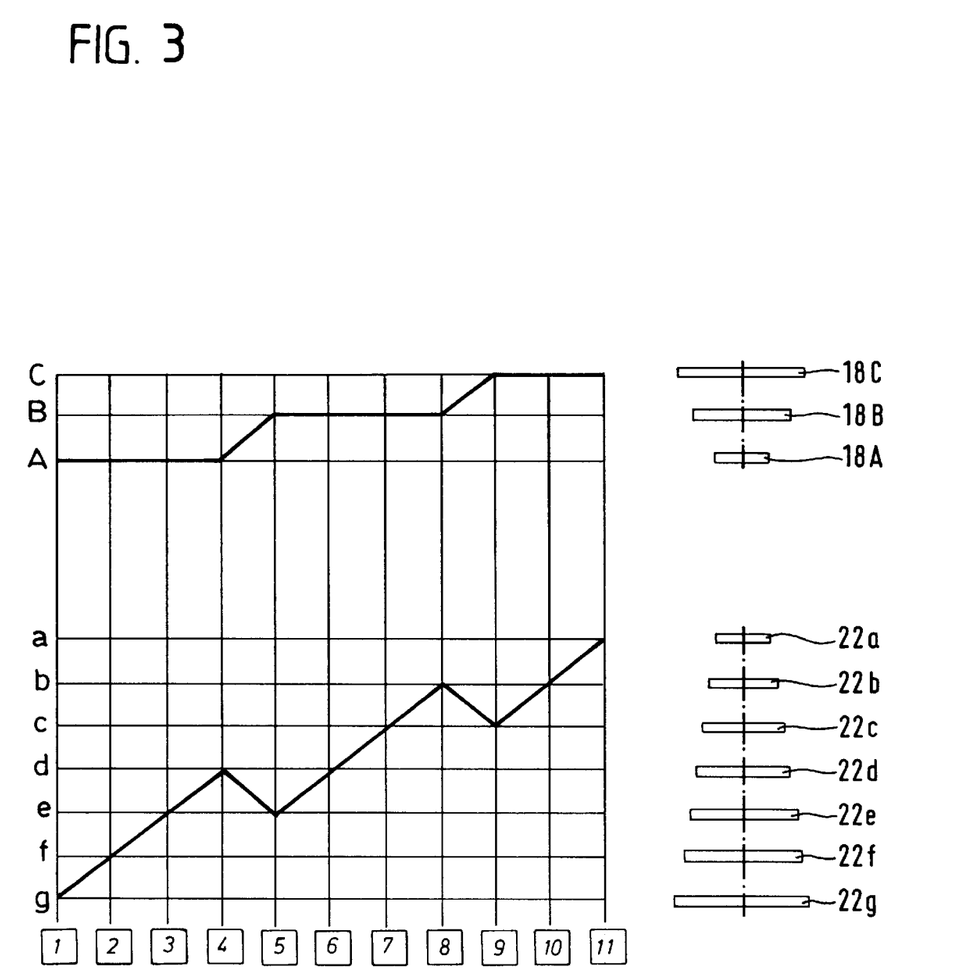
FIG. 3 is an embodiment of a switching arrangement for a gear change system with 3 chain wheels and a total of 7 pinions.

The choice of the respective pinion 22 and the choice of the respective chain wheel 18 is for example determined by a changing arrangement illustrated in FIG. 3, said arrangement being a conventional changing arrangement with which, for a specific number of teeth of the pinions 22 and of the chain wheels 18, a total of 11 speeds (1) to (11) can be chosen, the transmission ratios constantly increasing and ranging for example from 0.9, 1.1, 1.3, 1.5, 1.8, 2.1, 2.5, 2.9, 3.2, 3.7 to 4.0.

It follows from the switching arrangement illustrated in FIG. 3 that for example with the chain 20 engaging the chain wheel 18A, speeds 1 to 4 can be selected, the chain engaging the pinion 22g in first speed and then being able to be changed up successively until the chain engages the pinion 22d.

When switching from fourth to fifth speed the chain is shifted from the chain wheel 18A to the chain wheel 18B. In this case however the chain is also switched back from the pinion 22d to the pinion 22e. Between the fifth and eighth speeds the chain then continues to be switched successively from the pinion 22e, through the pinion 22d, the pinion 22c and finally to the pinion 22b, the chain always remaining on the chain wheel 18B.

Switching from the eighth speed to the ninth speed requires again a shifting of the chain from the chain wheel 18B to the chain wheel 18C and simultaneous shifting of the chain from the pinion 22b to the pinion 22c, so that the ninth, tenth and eleventh speeds can be selected by shifting the chain from the pinion 22c to the pinion 22b and the pinion 22a.

Figure 4:
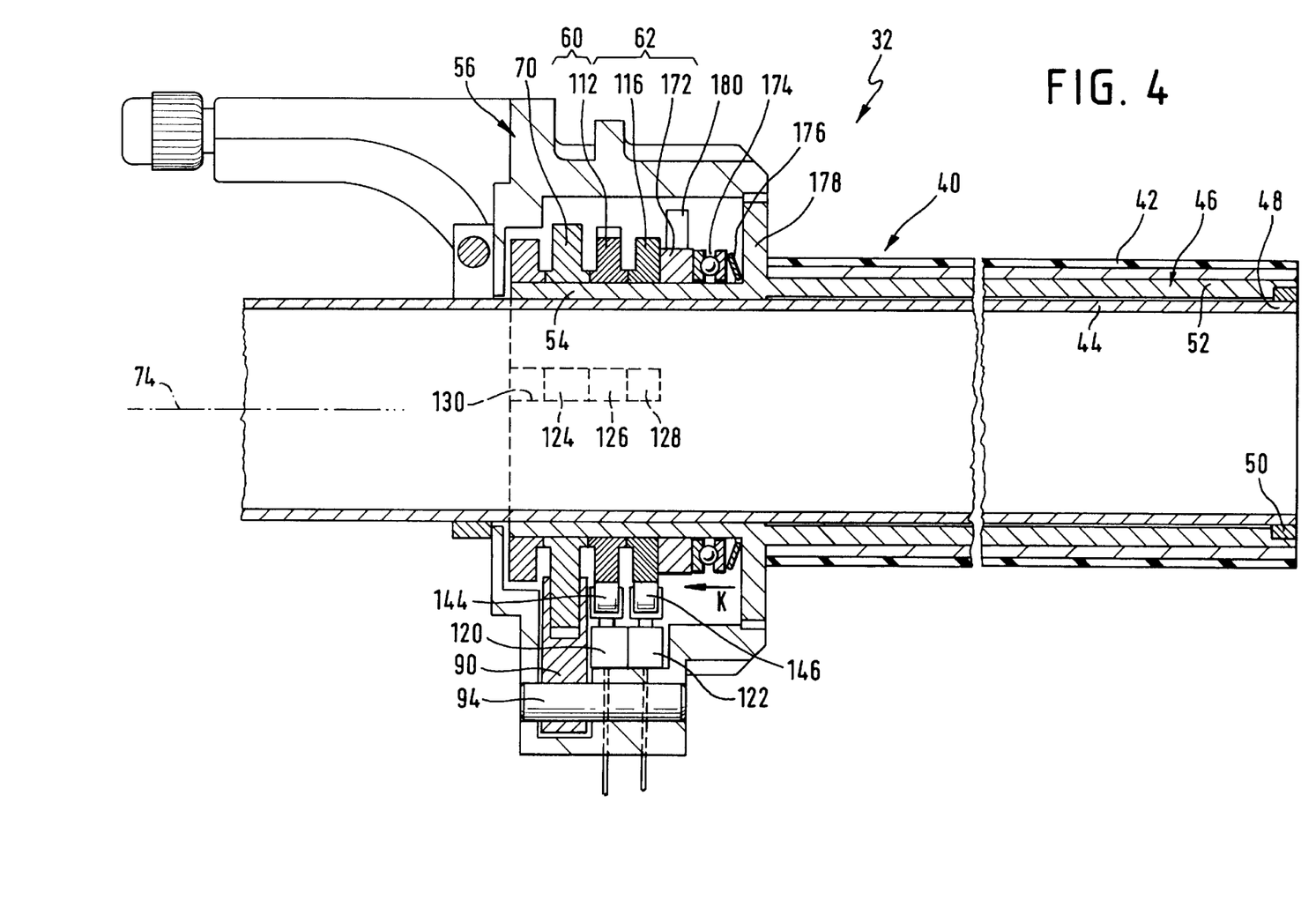
FIG. 4 is a longitudinal section through an embodiment of a gear change device.

The gear change device 32 shown on an enlarged scale in FIG. 4 comprises as switching element 40 a handle 42 of the handlebars, which is rotatably mounted by means of a sleeve 46 on a handlebar tube 44, the said sleeve 46 being slid over the handlebar tube 44 from an outer end 48 and secured and mounted thereon by means of a fastening ring 50.

The sleeve 46 comprises a first sleeve section 52, which carries the handle 42, and a second sleeve section 54, which adjoins the first sleeve section 52 and extends into a housing 56 in which are arranged a first switching unit 60 for the first chain changer 30 and a second switching unit 62 for the second chain changer 36.

Figure 5:
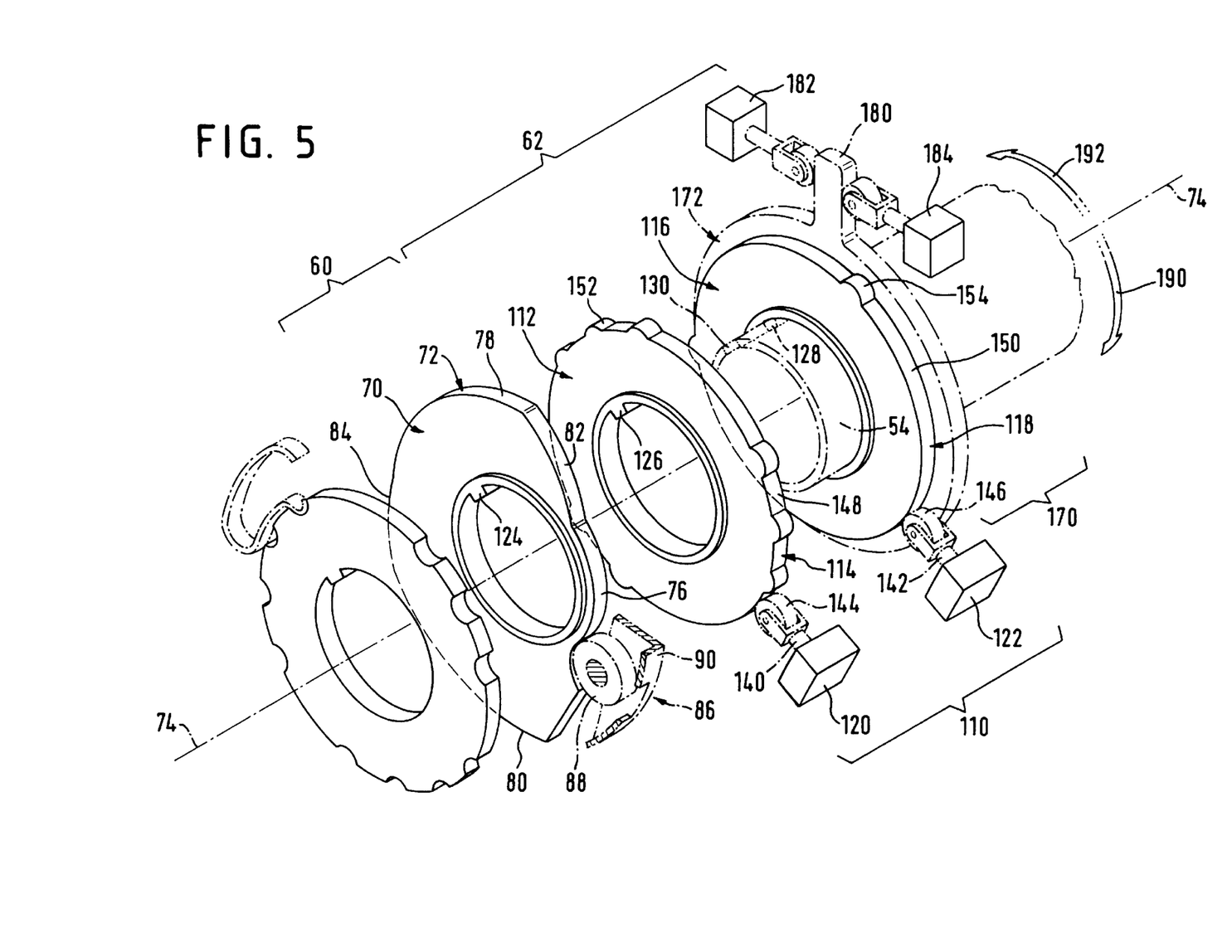
FIG. 5 is an exploded view of the individual elements of the gear change device.

As illustrated in FIG. 4 and particularly in FIG. 5 on an enlarged scale, the first switching unit 60 comprises a curved disc 70 which is provided on its outer circumference with a curved path 72. The curved disc 70 can rotate about an axis of rotation 74.

The curved path 72 comprises in all a first curved section 76, which has the smallest radial distance from the axis of rotation 74, then a second curved section 78, which has a larger radial distance from the axis of rotation 74, and finally a third curved section 80, which has the largest radial distance from the axis of rotation 74. In each curved section the curved path 72 runs at a constant radial distance from the axis of rotation 74, whereas in a first transition region 82 the radius increases from the radius of the first curved section 76 to the radius of the second curved section 78, and in a second transition region 84 the radius increases from the second curved section 78 to the third curved section 80 (FIG. 7).

Figure 7:
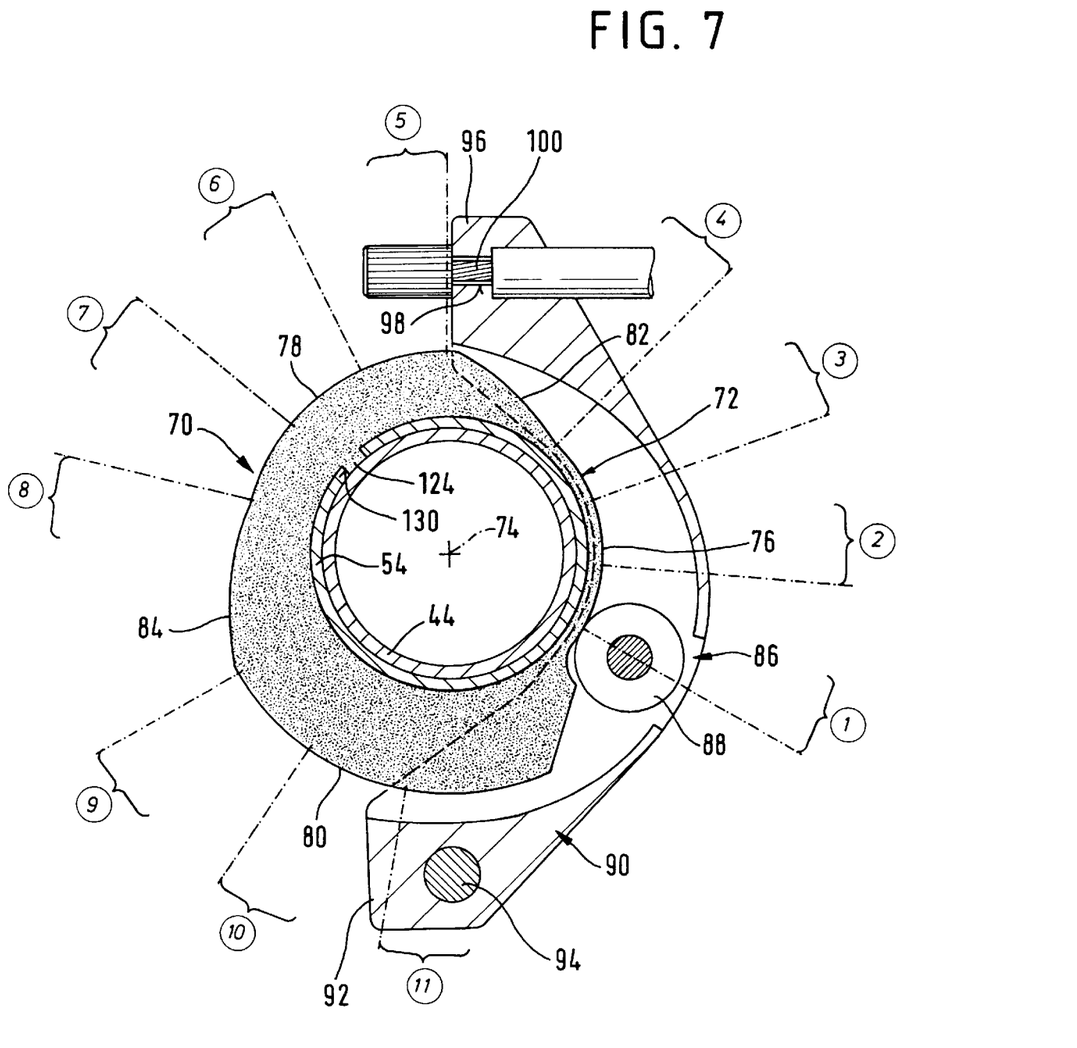
FIG. 7 is a section through a first mechanical switching unit.

A path follower 86 rests on the curved path 72, which follower comprises a tracing roller 88 that is rotatably mounted on a tracing lever 90, the tracing lever 90 being swivellably mounted at one end 92 to the housing 56 by means of a mounting bolt 94, as illustrated in FIG. 7, while at an end 96 opposite the end 92 the tracing lever 90 has a recess 98 for receiving a cable pull 100, by means of which the first chain changer 30 can be mechanically actuated, the tracing lever 90 together with its end 96 pulling more or less strongly on the cable pull 100 depending on which curved section 76, 78 or 80 the tracing roller 88 rests, thereby exerting a linear actuating movement on the first chain changer 30.

Figure 6:
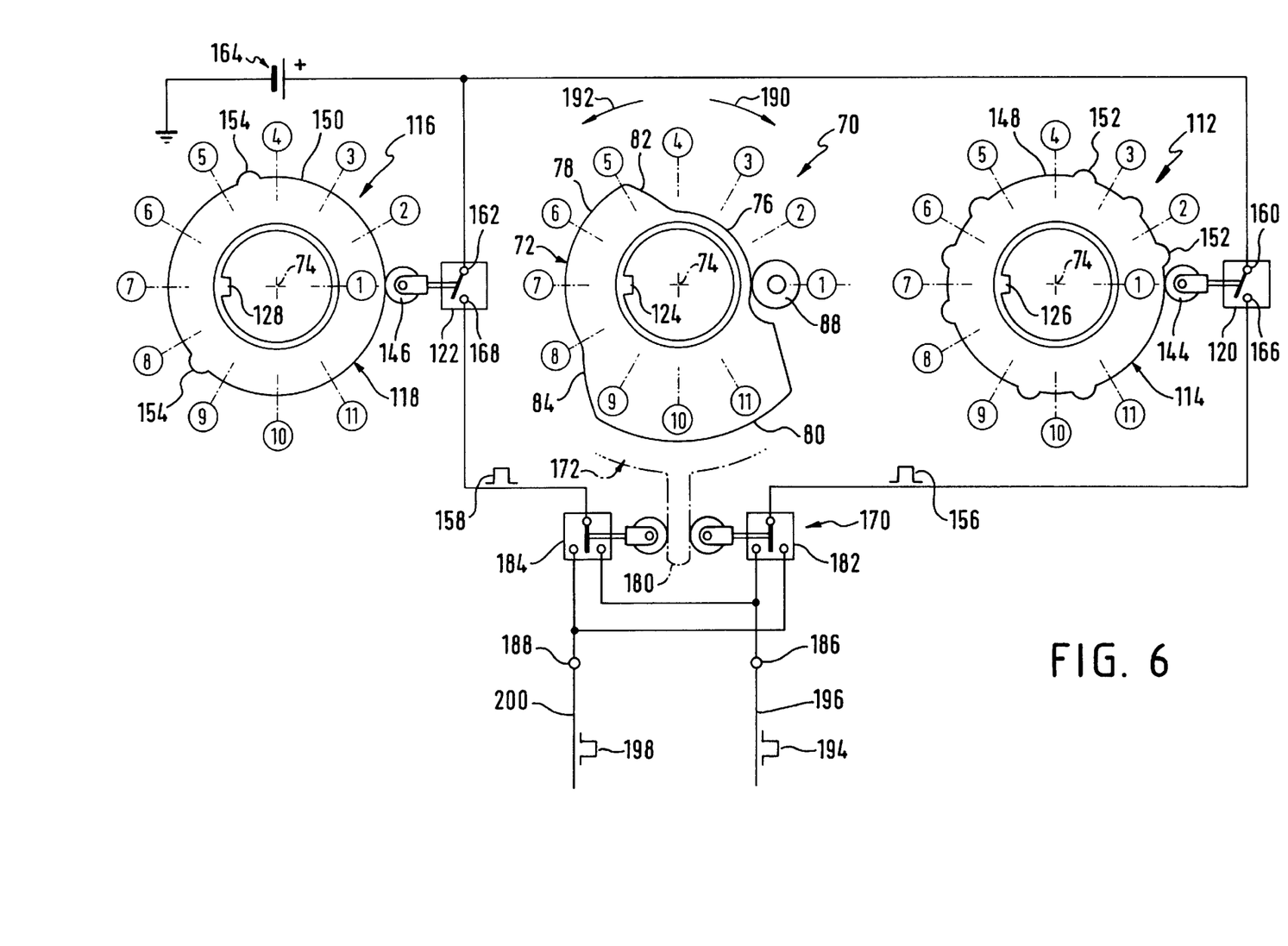
FIG. 6 is a diagrammatic functional illustration of all elements of the gear change device.

The second switching unit 62 comprises in its turn, as illustrated in FIGS. 5 and 6, a signal generator unit 110, which comprises a first link element 112 with a first link path 114, and a second link element 116 with a second link path 118, the first link path 114 acting on a first switching signal generator 120 and the second link path 118 acting on a second switching signal generator 122, which as illustrated in FIG. 6 are in the simplest case designed as sensors.

The first link element 112 and the second link element 116 can likewise rotate about the axis of rotation 74 and sit on the second sleeve section 54 in the same way as the curved disc 70, the said curved disc 70 together with a spring 124, the first link element 112 together with a spring 126, and the second link element 116 together with a spring 128 engaging in a groove 130 of the second sleeve section 54, and thus all are fixedly connected to one another and are also fixedly connected to the handle 42 through the first sleeve section 52.

The two switching signal generators 120 and 122 both have a tracer finger 140 and 142, each of the tracer fingers 140 and 142 being provided with a tracer roller 144 and 146 that runs on the first link path 114 and the second link path 118 respectively. Each of the link paths 114 and 118 has a base path 148 and 150 respectively surrounding the axis of rotation 74 at a constant radius, switching cams 152 and 154 projecting from the said base paths, with the result that when the tracer roller 144 or 146 runs over one of the switching cams 152 and 154 the respective switching signal generator 120 or 122 generates a switching pulse 156 or 158.

In order to generate such a switching pulse in each case a first connection 160 or 162 of the switching signal generators 120 and 122 is connected to a positive feed voltage of a voltage source 164 and a second connection 166 or 168 leads to a switching direction recognition unit, identified in general by the reference numeral 170, of the signal generator unit 110. The switching direction recognition unit comprises a control disc 172 with a control cam, the control disc 172 being able to be driven by rotational movement of the second sleeve section 54 through frictional contact, as illustrated in FIG. 4. To this end the control disc 172 is for example in frictional contact with the second link element 116 and on the side remote from the second link element 116 rests on an axial pivot bearing 174, which in turn is engaged by a disc spring 176 that is connected in an axially undisplaceable manner at a flange 178 to the second sleeve section 54 through its end that does not engage with the axial pivot bearing 174. The disc spring 176 acts on the pivot bearing 174 and this in turn acts on the control disc 172, which is thereby urged with an axial compression force K against the second link element 116 in order to effect the frictional engagement and driving of the control disc 172 with a rotational movement of the second link element 116.

The control disc 172 comprises for its part a control cam 180, which acts on two change-over switches 182 and 184 arranged on both sides of the control cam 180 and restricting the entrained movement of the control disc 172. If the handle 42 is turned in an "on" switching direction 190, the control cam 180 actuates the change-over switches 182 or 184 so that the second connection 166 of the first switching signal generator 120 is connected by the change-over switch 182 to an "on" signal connection 186, while the second connection 168 of the second switching signal generator 122 is connected by the change-over switch 184 to an "off" signal connection 188.

If on the other hand the handle 42 is turned in an "off" switching direction 192, then the change-over switch 182 connects the second connection 166 to the "off" signal connection 188 and the change-over switch 184 connects the second connection 168 of the second switching signal generator 122 to the "on" signal connection 186.

Every switching pulse appearing at the "on" signal connection 186 thus acts as an "on" switching pulse 194 and is transmitted via a signal line 196 connected to the "on" signal connection 186, while every switching pulse 156 or 158 arriving at the "off" signal connection 188 acts as an "off" switching pulse 198 and is transmitted via a corresponding signal line 200.

The second chain changer 36 is designed as an electrically switchable chain changer, which can be controlled via the signal lines 196 and 200. This second chain changer 36 is for example a chain changer manufactured by the company Mavic, which is described for example on page 40 of the journal "tour" 8/93.

The gear change device according to the invention operates as follows.

In the switching position corresponding to the first gear (first speed) the tracer roller 88 rests on the first curved section 76 so that—as already illustrated in FIG. 3—the chain 20 runs over the chain wheel 18A. In addition the second chain changer 36 is set so that the chain 20 runs over the pinion 22g.

If, starting from the first speed (1), the curved disc 70 and also the link elements 112 and 116 are now turned to the "on" switching position 190 by rotating the handle 42, the tracer roller 88 continues to run over the first curved section 76 without triggering any switching by the first chain changer 30. Furthermore, the tracer roller 146 runs between first and second speeds on the base path 150 without engaging a switching cam 154 arranged thereon.

On the other hand a switching cam 152 is arranged between the first speed (1) and the second speed (2), which cam thus actuates the first switching signal generator 120, which in turn emits the switching signal 156, and this is switched by the switching direction recognition unit 170 to the "on" signal connection 186. In this case the control cam 180 moves in the direction of the change-over switch 184, so that both change-over switches 182 and 184 are actuated so that the second connection 166 of the first switching signal generator 120 is connected to the "on" signal connection 186, and the second connection 168 of the switching signal generator 122 is connected to the "off" signal connection 188.

Changing from first to second speeds is thereby effected, as already illustrated in FIG. 3.

Likewise the first curved path 114 similarly has a switching cam 152 between respectively the switching position for the second speed (2) and the third speed (3), as well as between the latter and the switching position for the fourth speed (4), so that on rotating the handle 42 in each case the switching pulse 156 arrives at the "on" signal connection 186 and thereby switches the second chain changer 36 from the pinion 22*f* to the pinion 22*e* and from the latter to the pinion 22*d*.

The first curved section 76 extends from the switching position for the first speed (1) to the switching position for the fourth speed (4), at a constant radial distance from the axis of rotation 74.

Furthermore, the second curved path 118 does not have a switching cam 154 between the switching position for the first speed (1) and the switching position for the fourth speed (4).

On the second link path 118 a switching cam 154 is simply arranged between the switching position for the fourth speed (4) and the fifth speed (5), and the switching position between the eighth speed (8) and the ninth speed (9). If therefore a gear change is made from fourth (4) speed to fifth (5) speed, the switching cam 154 by actuating the second switching signal generator 122 thereby generates the switching pulse 158, which—since rotation is always in the "on" rotational direction 190—is transmitted from the change-over switch 184 to the "off" signal connection 188, with the result that on switching from fourth (4) speed to fifth (5) speed the second chain changer 36 receives an "off" switching pulse 198 and thus switches back from the pinion 22*d* to the pinion 22*e*. In addition the first link path 114 does not have any switching cam between the switching position for the fourth speed (4) and the switching position for the fifth speed (5), with the result that the first switching signal generator 120 does not produce any switching pulse 156.

Moreover the curved path 72 includes between the fourth (4) speed and the fifth (5) speed the first transition region 82, over the length of which the radius is increased by the transition to the second curved section 78. The tracer roller 88 will thus act on the cable pull 100 during the transition from the switching position for the fourth speed (4) to the switching position for the fifth speed (5), and will thereby actuate the first chain changer 30 so that the latter—as illustrated in FIG. 3—shifts the chain 20 from the chain wheel 18A to the chain wheel 18B.

The second curved section 78 extends from the switching position for the fifth speed (5) to the switching position for the eighth speed (8) with a constant radius, so that on changing up to higher speeds no switching process is initiated by the first chain changer 30.

On the other hand the first link part 114 has in each case a switching cam 152 between the switching position for the fifth speed (5) and the switching position for the sixth speed (6), and also between the latter and the switching position of the seventh speed (7), as well as between the latter and the switching position for the eighth speed (8), so that on further rotation in the "on" switching direction 190 the second chain changer 36 is always actuated so that it shifts the chain 20 from the pinion 22*e* to the pinion 22*d*, then to the pinion 22*c*, and finally to the pinion 22*b*.

On switching from eighth speed to ninth speed, the chain is switched back again from the pinion 22*b* to the pinion 22*c*, as is also illustrated in FIG. 3, so that the first link path 114 does not have a switching cam 152 between the switching position for the eighth speed (8) and the switching position for the ninth speed (9), whereas the second link path 118 has a switching cam 154 between these switching positions, with the result that again a switching back occurs.

In a similar way, the second transition region 84 lies between the switching position for the eighth speed (8) and the switching position for the ninth speed (9). In connection with this, between the switching position for the ninth speed (9) and the switching position for the tenth speed (10) as well as between the latter and the switching position for the eleventh speed (11), the chain is again shifted up by a switching cam 152 of the first link path 114 from the pinion 22*c* to the pinion 22*b* and finally to the pinion 22*a*, whereas in the third curved section 80 the tracer roller 88 does not produce any further switching and also no switching pulse is generated by the second link path 118.

On switching back the switching direction recognition unit 170 recognises the "off" switching direction 192. Accordingly, the control cam 180 moves in the direction of the change-over switch 182, so that now the change-over switch 184 connects the second connection of the second switching signal generator 122 to the "on" signal connection and the change-over switch 182 connects the second connection 166 to the "off" signal connection 188, and consequently the switching cam 154 between the switching position for the ninth speed and the switching position for the eighth speed as well as between the switching position for the fifth speed and the switching position for the fourth speed in each case generates a switching pulse 158 that is received at the "on" signal connection 186.

Moreover all switching cams 152 of the first link path 114 produce switching pulses 156 that are received at the "off" signal connection 188 as a result of the switch-over produced by the switching direction recognition unit 170, so that, according to the switching arrangement illustrated in FIG. 3, the chain is again switched back and also the first chain changer 30 too is actuated, mechanically via the cable pull 100 corresponding to FIG. 3, corresponding to the curved path 72, and sensed by the tracer roller 88.

What is claimed is:

1. A gear change system for derailleur gears, comprising:
   a first chain changer for shifting a chain to different chain wheels on a pedal-crank side;
   a second chain changer for shifting the chain to different pinions on a wheel side; and
   a gear change device with a first switching unit for the first chain changer, a second switching unit for the second chain changer, and a manually operated switching element by means of which both of said first and second switching units can be simultaneously operated so that, by means of the simultaneously operated first and second switching units, the chain can be shifted to a chain wheel/pinion combination selected for a gear sequence, and from a switched gear a transition is possible only to a next closest gear in the gear sequence;
   wherein the first chain changer is a mechanical chain changer mechanically controllable by the first switching unit, and the second chain changer is a chain changer electrically controllable through the second switching unit.

2. A gear change system according to claim 1, wherein:
   the second switching unit comprises a switching signal generator unit that generates switching signals on actuation of the switching element.

3. A gear change system according to claim 2, wherein:
   the switching element is rotatable about an axis; and
   the switching signal generator unit generates the switching signals following a rotational movement produced by the switching element.

4. A gear change system according to claim 2, wherein:
the signal generator unit generates electrical "on" or "off" switching signals for the second chain changer.

5. A gear change system according to claim 4, wherein:
the "on" switching signals and the "off" switching signals are emitted at separate signal connections.

6. A gear change system according to claim 2, wherein:
the signal generator unit generates current pulses as said switching signals.

7. A gear change system according to claim 2, wherein:
the switching signal generator unit has a gear shifting gate which cooperates with an electrical switching signal generator unit.

8. A gear change system according to claim 7, wherein:
the electrical switching signal generator unit comprises two switching signal generators, each of which, when actuated by the gear shifting gate, generates the switching signals; and
the gear switching gate comprises two link paths, each of which acts on one of the switching signal generators.

9. A gear change system according to claim 2, wherein:
the switching signal generator unit has a switching direction recognition unit, which, depending on a switching direction, emits switching signals generated by the switching signal generator unit as at least one of "on" switching signals and "off" switching signals.

10. A gear change system according to claim 9, wherein:
the switching direction recognition unit, depending on a switching direction, emits the switching signals of one of the switching signal generators as the "on" switching signals and the switching signals of the other switching signal generator as the "off" switching signals.

11. A gear change system according to claim 1, wherein:
the first switching unit has a curved path element and a path follower cooperating therewith, via which the first chain changer can be mechanically actuated.

12. A gear change system according to claim 11, wherein:
angular ranges of said curved path element between the switching positions in which the chain is shifted from one chain wheel to another chain wheel are greater than remaining angular ranges of said curved path element in which the chain is not shifted from one chain wheel to another chain wheel.

13. A gear change device for controlling derailleur gears of a chain-driven vehicle, said vehicle including a mechanically-operated first chain changer for shifting a chain to one of a plurality of chain wheels on a pedal-crank portion of said vehicle, and an electronically-controllable second chain changer for shifting said chain to one of a plurality of pinions on a drive wheel of said vehicle, said device comprising:
a first switching unit which is adapted to be mechanically linked to said first chain changer for controlling said first chain changer to shift said chain to a selected one of said chain wheels;
a second switching unit which is adapted to be electronically linked to said second chain changer for controlling said second chain changer to shift said chain to a selected one of said pinions; and
a manually operated switching element for controlling a gear change by simultaneously operating both of said first and second switching units such that, for a gear change:
(a) a particular one of said chain wheels is selected by said first chain changer;
(b) a particular one of said pinions is selected by said second chain changer; and
(c) said second switching unit is adapted to send an electronic signal to said second chain changer to select said particular one of said pinions according to the particular one of said chain wheels which is selected.

14. A gear change device according to claim 13, wherein:
for each chain wheel which is selected for said gear change, a corresponding subset of said plurality of pinions can be selected; and
a transition of said chain at said pinions is possible only between immediately neighboring ones of said pinions.

15. A gear change device according to claim 14, wherein:
said corresponding subsets of said pinions overlap one another by at least one pinion such that, for a gear change from a first of said chain wheels to a next larger one of said chain wheels, said second switching unit is adapted to send an electronic signal to said second chain changer to select a next larger one of said pinions.

16. A gear change device according to claim 14, wherein:
said corresponding subsets of said pinions overlap one another by at least one pinion such that, for a gear change from a first of said chain wheels to a next smaller one of said chain wheels, said second switching unit is adapted to send an electronic signal to said second chain changer to select a next smaller one of said pinions.

17. A gear change device according to claim 13, wherein:
the second switching unit comprises a switching signal generator unit that generates switching signals on actuation of the switching element.

18. A gear change device according to claim 17, wherein:
the switching element is rotatable about an axis; and
the switching signal generator unit generates the switching signals following a rotational movement produced by the switching element.

19. A gear change device according to claim 17, wherein:
the signal generator unit generates electrical "on" or "off" switching signals for the second chain changer for controlling said second chain changer.

20. A gear change device according to claim 19, wherein:
the "on" switching signals and the "off" switching signals are emitted at separate signal connections.

21. A gear change device according to claim 17, wherein:
the signal generator unit generates current pulses as said "on" and "off" switching signals.

22. A gear change device according to claim 17, wherein:
the switching signal generator unit has a gear shifting gate which cooperates with an electrical switching signal generator unit for generating said switching signals.

23. A gear change device according to claim 22, wherein:
the electrical switching signal generator unit comprises two switching signal generators, each of which, when actuated by the gear shifting gate, generates the switching signals; and
the gear switching gate comprises two link paths, each of which acts on one of the switching signal generators.

24. A gear change device according to claim 17, wherein:
the switching signal generator unit has a switching direction recognition unit, which, depending on a switching direction, emits switching signals generated by the switching signal generator unit as at least one of "on" switching signals and "off" switching signals.

25. A gear change device according to claim 24, wherein:

the switching direction recognition unit, depending on a switching direction, emits the switching signals of one of the switching signal generators as the "on" switching signals and the switching signals of the other switching signal generator as the "off" switching signals.

26. A gear change device according to claim 13, wherein:

the first switching unit has a curved path element and a path follower cooperating therewith, via which the first chain changer can be mechanically actuated.

27. A gear change device according to claim 26, wherein:

angular ranges of said curved path element between the switching positions in which the chain is shifted from one chain wheel to another chain wheel are greater than remaining angular ranges of said curved path element between the switching positions in which the chain is not shifted from one chain wheel to another chain wheel, but is only shifted between said pinions.

28. A gear change device according to claim 13, wherein:

said first switching unit is mechanically linked to said first chain changer via a push-pull cable.

29. A gear change device according to claim 13, wherein:

said manually operated switching element is designed as a twist grip.

* * * * *